United States Patent
Fuchs et al.

(10) Patent No.: US 7,008,654 B1
(45) Date of Patent: Mar. 7, 2006

(54) GELLED NUTRITIONAL COMPOSITION AND PROCESS

(75) Inventors: Eileen C. Fuchs, Monroe, CT (US); Helen Gillian Anantharaman, Bridgewater, CT (US); Chandrasekhara Reddy Mallangi, New Milford, CT (US)

(73) Assignee: Nestec S.A., Vevey (SE)

( * ) Notice: Subject to any disclaimer, the term of this patent is extended or adjusted under 35 U.S.C. 154(b) by 54 days.

(21) Appl. No.: 10/019,964

(22) PCT Filed: Jul. 5, 2000

(86) PCT No.: PCT/EP00/06362

§ 371 (c)(1),
(2), (4) Date: Feb. 21, 2003

(87) PCT Pub. No.: WO01/01789

PCT Pub. Date: Jan. 11, 2001

Related U.S. Application Data

(60) Provisional application No. 60/142,367, filed on Jul. 6, 1999.

(51) Int. Cl.
*A23L 1/30* (2006.01)
*A23L 2/304* (2006.01)
*A23L 1/0562* (2006.01)

(52) U.S. Cl. ............... 426/72; 426/74; 426/573; 426/656

(58) Field of Classification Search ............... 426/72, 426/73, 74, 573, 656
See application file for complete search history.

(56) References Cited

U.S. PATENT DOCUMENTS

| 2,487,600 | A | * | 11/1949 | Schneiderwirth | ........... 516/102 |
| 4,362,761 | A | | 12/1982 | Chang et al. | |
| 4,720,390 | A | * | 1/1988 | Bachler et al. | ............. 426/573 |
| 4,919,958 | A | * | 4/1990 | Kadan et al. | ............... 426/573 |

FOREIGN PATENT DOCUMENTS

| EP | 0 129 346 A1 | 12/1984 |
| EP | 0 371 659 A2 | 6/1990 |

OTHER PUBLICATIONS

Pennington, J. Bowes & Church's Food Values of Portions Commonly Ued, 17th ED., 1998 Lippincott-Raven Publishers, N. Y., p. 58.*

* cited by examiner

*Primary Examiner*—Helen Pratt
(74) *Attorney, Agent, or Firm*—Bell, Boyd & Lloyd LLC

(57) ABSTRACT

A nutritional supplement in the form of a gelled nutritional composition. The composition contains gelled whey protein; a carbohydrate source; minerals; and vitamins. The composition may have a viscosity of about 5000 cp to about 40000 cp and an energy density of about 800 kcal/l to about 1200 kcal/l. The composition is suitable for dysphagia patients, children and athletes.

11 Claims, No Drawings

GELLED NUTRITIONAL COMPOSITION AND PROCESS

This application claims the benefit of Provisional Application No. 60/142,367, filed Jul. 6, 1999.

FIELD OF THE INVENTION

This invention relates to a gelled nutritional composition which may provide a nutritional supplement; for example for dysphagia patients and children. The invention also relates to a process for producing the gelled nutritional composition and to a method for providing nutrition to a dysphagic patient.

BACKGROUND OF THE INVENTION

Many people do not take in sufficient nutrients for a nutritionally complete diet. In order to assist these people, nutritional supplements have been developed. Nutritional supplements are not intended to provide all the nutrients necessary for a nutritionally complete diet; instead they are intended to supplement the diet such that it becomes more nutritionally complete.

There are many targets for nutritional supplements; for example children, the elderly and patients suffering for dysphagia. Dysphagia, the feeling of difficulty in swallowing, is common in all age groups but is especially prevalent amongst the elderly. Typical symptoms may include drooling, a feeling that food is sticking in the throat, discomfort in the chest or throat, a feeling of a lump in the throat, and coughing or choking caused by food not passing easily to the stomach and being sucked into the lungs.

Dysphagia may be caused by many factors. For example, simple causes may be poor teeth, ill-fitting dentures, influenza, or gastroesophageal reflux. Other more serious causes include strokes, progressive neurological disorders, the presence of tracheotomy tubes, paralyzed vocal cords, tumors or surgery to the head, neck or esophageal areas.

Ordinarily, for most people, the condition clears up itself reasonably rapidly or may be easily treated by having appropriate dental work done. However, for more serious cases, the condition may not be easily remedied. In these cases, the patient often suffers weight loss and other complications of inadequate nutrition and liquid intake.

It is generally found that patients suffering from dysphagia are able to better swallow more viscous foods and drinks. Therefore it has been suggested to add viscosity increasing agents to drinks and liquid foods to assist dysphagia patients with swallowing. For example, Japanese patent application 5-38262 describes an agent which is made up of alpha-lized starch and dextrin. The agent may be added to liquid foods to thicken them without changing the color, taste and flavor of the liquid foods. Further, soluble coffee powders which provide thickened coffee beverages are available on the market under the trade name RESOURCE (Novartis Nutrition). These powders contain modified starches to provide the coffee beverage with a "honey-like" consistency.

However, there is still a need for nutritional compositions which may be more readily consumed by dysphagia patients and are of high nutritional value.

Further, for patients in general who require nutritional supplementation, taste fatigue is a common problem; especially among children and the elderly. Nutritional supplements with new and interesting organoleptic properties and appearances are constantly needed to deal with the problem.

In particular, nutritional supplements which do not have a milky appearance and taste are extremely desirable. In order to meet this need, nutritional supplements in the form of fruit juices are described in European patent application 0486425 and U.S. Pat. No. 5,641,531. However, these products are not ideally suited to dysphagia patients. Further, nutritional supplements with other organoleptic properties and appearances are needed.

Therefore an object of this invention is to provide a nutritional composition which is suitable for dysphagia patients and which has a gelled consistency.

SUMMARY OF THE INVENTION

Accordingly, in one aspect, this invention provides gelled nutritional composition comprising a protein source including gelled whey protein; a carbohydrate source; minerals; and vitamins.

The gelled nutritional composition is preferably in the form of a clear gel. Further, the gelled nutritional composition preferably provides about 30% to about 100% of the recommended daily allowance of vitamins and minerals per 1000 calories. The energy density is preferably about 800 kcal/l to about 1200 kcal/l.

The viscosity of the gelled nutritional composition is preferably about 5000 cp to about 40000 cp.

In another aspect, this invention provides a method of providing nutrition to a patient suffering from dysphagia, the method comprising administering to the patient a gelled nutritional composition which, contains a protein source including gelled whey protein; a carbohydrate source; minerals; and vitamins.

In a further aspect, this invention provides a method for providing supplemental nutrition to a child, the method comprising administering to the child a gelled-nutritional composition which contains a protein source including gelled whey protein; a carbohydrate source; minerals; and vitamins.

DETAILED DESCRIPTION OF PREFERRED EMBODIMENTS OF THE INVENTION

Embodiments of the invention are now de-scribe-d by way of example only. This invention provides a nutritional composition which is in the form of a gel. The composition contains a protein source which includes gelled whey protein; a carbohydrate source; minerals; and vitamins. The nutritional composition is ideally suited as a nutritional supplement; especially for children and dysphagia patients.

The protein source includes whey protein. The whey protein may be any commercially available whey protein source which is in substantially intact form. Preferably, however, the whey protein is a, whey protein isolate. Whey protein isolates contain more than 90% by weight of whey protein. Suitable whey protein isolate sources include ALACEN 895(New Zealand Milk Products Inc), BiPRO (Le Sueur Isolates of Le Sueur, Minn.), PROVON-190 (Avonmore Ingredients Inc of Monroe Wis.) and LACPRODAN 9212 (Royal Proteins, Inc of Rosemont Ill.)

The protein source may, if desired, include minor amounts of other suitable types of protein. For example, the protein source may further include minor amounts of casein protein, soy protein, rice protein, pea protein, carob protein, oat protein, caseino-glyco-macropepfide or mixtures of these proteins. Further, if desired, the protein source may further include minor amounts of free amino acids. The other suitable types of protein preferably comprise less than about 20% by weight of the protein source; more preferably less than about 10% by weight. Most other types of protein do not provide a clear gel and hence the protein source preferably contains little or no protein other than whey protein.

The protein source preferably provides about 5% to about 40% of the energy of the nutritional composition. More preferably, the protein source provides about 10% to about 25% of the energy of the nutritional composition; for example about 14% to about 16%. In terms of weight, the protein preferably provides about 1% to about 5% by weight of the nutritional composition.

The nutritional composition also includes a carbohydrate source. The carbohydrate source preferably provides about 60% to about 95% of the energy of the nutritional composition. More preferably, the carbohydrate source provides about 75% to about 90% of the energy of the composition; for example about 84% to about 86%. In terms of weight, the carbohydrate preferably provides about 10% to about 25% by weight of the nutritional composition.

Any suitable carbohydrate source may be used including maltodextrin, starch including modified starch, glucose, fructose, corn syrup and sucrose, or mixtures thereof. Preferably the carbohydrate source is free from lactose. If the nutritional composition contains fruit juices, the carbohydrates in the fruit juice form part of the carbohydrate source.

A preferred carbohydrate source is a mixture of maltodextrin and sucrose or high fructose corn syrup, or both. The maltodextrin preferably has a dextrose equivalent (DE) of at least about 10 but maltodextrins having a DE below 10 would also work Preferably the DE of the maltodextrin is about 15. The carbohydrate source preferably comprises about 20% to about 50% by weight of maltodextrin and about 50% to about 80% by weight of sucrose or high fructose corn syrup, or both.

The nutritional composition may include a lipid source but preferably does not. The addition of a lipid source to the nutritional composition will in a gel which is not totally clear. However, if this is acceptable, a lipid source may be added. If a lipid source is added, it preferably provides about 1% to about 50% of the energy of the nutritional composition; more preferably about 1% to about 10%. Suitable lipid sources include vegetable oils such as safflower oil, corn oil, canola oil, soybean oil and olive oil.

The nutritional composition preferably includes a substantially complete vitamin and mineral profile. For example, sufficient vitamins and minerals may be provided to supply about 30% to about 250% of the US recommended daily allowance of the vitamins and minerals per 1000 calories of the nutritional composition; more preferably about 30% to about 100%. Suitable ranges for vitamins and minerals are as follows:

| Nutrient | Range per 100 g | Preferred range per 100 g |
| --- | --- | --- |
| Sodium | 10 to 50 mg | 25 to 35 mg |
| Potassium | 10 to 50 mg | 25 to 35 mg |
| Calcium | 20 to 270 mg | 40 to 60 mg |
| Magnesium | 0 to 108 mg | 10 to 30 mg |
| Phosphorus | 20 to 270 mg | 85 to 105 mg |
| Iron | 0 to 4.9 mg | 0.5 to 1.0 mg |
| Copper | 0 to 0.54 mg | 0.05 to 0.20 mg |
| Zinc | 0 to 4 mg | 0.80 to 1.10 mg |
| Manganese | 0 to 500 µg | 100 to 200 µg |
| Chromium | 0 to 32.4 µg | 1 to 2.5 µg |
| Molybdenum | 0 to 20.25 µg | 2 to 10 µg |
| Selenium | 0 to 18.9 µg | 1 to 5 µg |
| Iodine | 0 to 41 µg | 2 to 10 µg |
| Vitamin C | 0 to 16.2 mg | 5 to 15 mg |
| Vitamin B1 | 0 to 0.4 mg | 0.05 to 0.2 mg |
| Vitamin B2 | 0 to 0.46 mg | 0.05 to 0.2 mg |
| Niacin | 0 to 5.4 mg | 1 to 2 mg |
| Vitamin B6 | 0 to 0.54 mg | 0.1 to 0.3 mg |
| Vitamin B12 | 0 to 1.62 µg | 0.2 to 0.6 µg |
| Pantothenic acid | 0 to 2.7 | 0.5 to 1 mg |
| Folic acid | 0 to 108 µg | 10 to 50 µg |
| Biotin | 0 to 81 µg | 10 to 30 µg |
| Vitamin A | 0 to 331.8 IU | 150 to 300 IU |
| β-carotene | 0 to 0.1 mg | 0.05 to 0.09 mg |
| Vitamin D3 | 0 to 28.06 IU | 10 to 25 IU |
| Vitamin E | 0 to 2.31 IU | 1 to 2 IU |
| Vitamin K | 0 to 4.01 µg | 2 to 3 µg |
| Choline | 0 to 26.1 mg | 20 to 25 mg |
| Taurine | 0 to 4.99 mg | 4 to 4.5 mg |

The nutritional composition preferably has an energy content of about 800 kcal/l to about 1200 kcal/l; for example an energy content of about 1000 kcal/l.

The nutritional composition preferably has a pH in the range of about 3.5 to about 4.1. Therefore food grade acidifying agents are preferably included Examples of suitable acidifying agents include food grade citric acid, malic acid, HCl, phosphoric acid, or mixtures of these acids. Mixtures of malic and phosphoric and citric and phosphoric are particularly preferred. If a fruit juice is included in the nutritional composition, the fruit juice will also provide some acidifying agents.

The nutritional composition may include flavors as desired. If a fruit juice is included in the nutritional composition, the fruit juice will provide flavor. However artificial flavors may also be used; either alone or in addition to natural flavors.

The nutritional composition preferably has a viscosity above about 5000 cp; more preferably about 8000 cp to about 40000 cp. If a soft gel is desired, viscosities in the range of about 10000 cp to about 15000 are ideal. For pudding-like products, viscosities in the range of about 30000 cp to about 38000 cp are desirable.

The nutritional composition may be produced by suspending the protein source in water under stirring. The carbohydrate source, the lipid source if used, the vitamins and minerals, acidifying agents, flavors, and colors may then be added to provide a liquid mixture. Commercially available liquefiers may be used to form the liquid mixture. The temperature of the liquid mixture may be room temperature but high temperatures may also be used if desired.

The liquid mixture is then standardized to provide a desired solids content; for example of about 20% to about 28% by weight. More preferably, the solids content is about 24% to about 26%. The pH may be standardized to about 3.5 to about 4.1.

If the liquid mixture contains lipids, the mixture may then be homogenized; for example in two stages at about 7 MPa to about 40 MPa in the first stage and about 2 MPa to about 14 MPa in the second stage. If not done prior to homogenization, the pH and solids content of the homogenized mixture may be standardized at this point. Homogenization is not necessary for products which do not contain lipids.

The homogenized mixture is then filled into containers and gelled. This may be accomplished in many ways. For example, the homogenized mixture may be rapidly heated to about 90 to 95° C. in a plate heat exchanger and then hot filled into containers. The containers are sealed and held at a temperature of at least about 80° C. for a time sufficient to complete gelling of the whey protein; for example for about 5 to 10 minutes. The containers are then cooled to ambient temperature to provide a gelled nutritional composition.

Alternatively, the homogenized mixture may be filled into containers at ambient temperature. The containers are sealed and then heated to a temperature of at least about 80° C. for a time sufficient to gel the whey protein; for example for about 10 to 20 minutes. The containers are then cooled to ambient temperature to provide a gelled nutritional composition.

The nutritional compositions may be used as nutritional supplements for dysphagia patients. The amount of the nutritional composition required to be consumed by a patient will vary depending upon factors such as the patient's condition, the patient's body weight, the age of the patient, and other sources of nutrition. However the required amount may be readily set by a medical practitioner or nutritionist.

Similarly, the nutritional compositions may be used as nutritional supplements in general; especially for children. The amount of the nutritional composition required to be consumed is not critical.

The nutritional compositions way also be used as nutritional supplements for athletes. In this form, the nutritional compositions are preferably packaged into squeeze packs which are easy to handle and use when active.

Specific examples of the invention are now described by way of further illustration.

EXAMPLE 1

Water at room temperature is placed in a batch mixing tank and stirred at a moderate speed. Whey protein isolate (ALACEN 895) is added to the water. A carbohydrate mixture of maltodextrin (DE 15), a sweetener and optionally a starch is added to solution under stirring. Minerals are then added. The solution is then acidified to a pH of about 3.6 using an acid mixture of malic acid and phosphoric acid and fruit juices. Flavors, colors and vitamins are then added. The solids content of the solution is then standardized to the desired level if necessary.

The solution is then rapidly heated to about 90 to 95° C. in a plate heat exchanger and hot filled into containers. The containers are sealed and held at a temperature of at least about 80° C. for about 5 to 10 minutes. The products are then cooled to ambient temperature. The composition of the products is as follows:

| Nutrient | Concentration (weight %) |
| --- | --- |
| Whey protein isolate | 2–4.5 |
| Carbohydrates | 11–20 |
| Maltodextrin | 5–8 |
| Starch | 0–1 |
| Sucrose and/or high fructose corn syrup. | 6–11 |
| Fruit Juice | 5–50 |

The vitamin and mineral profile of the products is as follows:

| Nutrient | Amount per 100 g |
| --- | --- |
| Sodium | 28 mg |
| Potassium | 28 mg |
| Calcium | 50 mg |
| Magnesium | 20 mg |
| Phosphorus | 94 mg |
| Iron | 0.84 mg |
| Copper | 0.10 mg |
| Zinc | 0.93 mg |
| Manganese | 141 µg |
| Chromium | 1.7 µg |
| Molybdenum | 6.2 µg |
| Selenium | 3.1 µg |
| Iodine | 6.75 µg |
| Vitamin C | 11.25 mg |
| Vitamin B1 | 0.11 mg |
| Vitamin B2 | 0.14 mg |
| Niacin | 1.46 mg |
| Vitamin B6 | 0.2 mg |
| Vitamin B12 | 0.42 µg |
| Pantothenic acid | 0.74 |
| Folic acid | 28.14 µg |
| Biotin | 22 µg |
| Vitamin A | 225 IU |
| β-carotene | 0.07 mg |
| Vitamin D3 | 18.75 IU |
| Vitamin E | 1.52 IU |
| Vitamin K | 2.64 µg |
| Choline | 23.92 mg |
| Taurine | 4.22 mg |

The products have a solids concentration of about 24 to about 26% by weight and a pH of about 3.5 to about 4.1. The products are in the form of a clear gel. The energy density of the products is 1000 kcal/l. The viscosities range from about 10000 cp to about 35000 cp when measured using a Brookfield LV-1 viscometer with a No. 4 spindle at 12 rpm.

EXAMPLE 2

The process of example 1 is repeated except that the homogenized solution is filled into containers at ambient temperature. The containers are sealed and held at a temperature of at least about 80° C. for about 10 to 20 minutes. The products are then cooled to ambient temperature.

The products have a solids concentration of about 24 to about 26% by weight and a pH of about 3.5 to about 4.1. The products are in the form of a clear gel. The energy density of the products is 1000 kcal/l. The viscosities range from about 10000 cp to about 35000 cp when measured using a Brookfield LV-1 viscometer with a No 4 spindle at 12 rpm.

EXAMPLE 3

A nutritional composition produced according to example 1 and which has a viscosity of about 35000 is given to an elderly patient suffering from a swallowing disorder. The patient is able to consume the nutritional supplement without great difficulty and much easier than liquids. Further the patient finds the product to have a good mouthfeel.

We claim:

1. A gelled nutritional composition comprising a protein source including gelled whey protein; a carbohydrate source; minerals; and vitamins; in which gelled nutritional composition the protein source provides 10% to 25% of the energy of the composition and the carbohydrate source provides 75% to 90% of the energy of the composition and the composition provides 30% to 100% of the recommended daily allowance of vitamins and minerals per 1000 kcal (4187 kJ).

2. A gelled nutritional composition according to claim 1 which is a clear gel.

3. A gelled nutritional composition according to claim 1 which has an energy density of 800 kcal/l to 1200 kcal/l (3350 kJ/l to 5024 kJ/l).

4. A gelled nutritional composition according to claim 1 which has a pH of 3.5 to 4.1.

5. A method of providing nutrition to a patient suffering from dysphagia, the method comprising administering to the patient a gelled nutritional composition which contains a protein source including gelled whey protein; a carbohydrate source; minerals; and vitamins in which in the gelled nutritional composition, the protein source provides 10% to 25% of the energy of the composition and the carbohydrate source provides 75% to 90% of the energy of the composition, and in which the composition provides 30% to 100% of the recommended daily allowance of vitamins and minerals per 1000 Kcal (4187 kJ).

6. A method according to claim 5 in which the gelled nutritional composition is a clear gel.

7. A method according to claim 5 in which the gelled nutritional composition has an energy density of 800 kcal/l to 1200 kcal/l (3350 kJ/l to 5024 kJ/l).

8. A method according to claim 5 in which the gelled nutritional composition has a viscosity of 5000 cp to 40000 cp.

9. A method for providing supplemental nutrition to a child, the method comprising administering to the child a gelled nutritional composition which contains a protein source including gelled whey protein; a carbohydrate source; minerals; and vitamins in which in the gelled nutritional composition, the protein source provides 10% to 25% of the energy of the composition and the carbohydrate source provides 75% to 90% of the energy of the composition, and in which the composition provides 30% to 100% of the recommended daily allowance of vitamins and minerals per 1000 Kcal (4187 kJ).

10. A gelled nutritional composition comprising a protein source including gelled whey protein; a carbohydrate source; minerals; and vitamins; in which gelled nutritional composition the protein source provides 10% to 25% of the energy of the composition and the carbohydrate source provides 75% to 90% of the energy of the composition wherein the gelled nutritional composition has a viscosity of 5000 cp to 40000 cp.

11. A gelled nutritional composition comprising a protein source including gelled whey protein; a carbohydrate source; minerals; and vitamins; in which gelled nutritional composition the protein source provides 10% to 25% of the energy of the composition and the carbohydrate source provides 75% to 90% of the energy of the composition wherein the gelled nutritional composition has a viscosity of 5000 cp to 40000 cp and is in the form of a clear gel.

* * * * *